(12) United States Patent
Aho et al.

(10) Patent No.: US 7,093,132 B2
(45) Date of Patent: Aug. 15, 2006

(54) METHOD AND APPARATUS FOR PROTECTING ONGOING SYSTEM INTEGRITY OF A SOFTWARE PRODUCT USING DIGITAL SIGNATURES

(75) Inventors: Michael Edward Aho, Rochester, MN (US); James Richard Coon, Rochester, MN (US); Harold Olaf Romo, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 970 days.

(21) Appl. No.: 09/957,421

(22) Filed: Sep. 20, 2001

(65) Prior Publication Data
US 2003/0056102 A1 Mar. 20, 2003

(51) Int. Cl.
*H04L 9/00* (2006.01)
*G06F 7/04* (2006.01)

(52) U.S. Cl. ............................ 713/176; 726/30; 705/57
(58) Field of Classification Search ..................... None
See application file for complete search history.

(56) References Cited

U.S. PATENT DOCUMENTS

| | | | | |
|---|---|---|---|---|
| 5,892,904 | A * | 4/1999 | Atkinson et al. | 726/22 |
| 5,974,549 | A * | 10/1999 | Golan | 726/23 |
| 5,978,484 | A * | 11/1999 | Apperson et al. | 705/54 |
| 5,987,123 | A | 11/1999 | Scott et al. | 713/165 |
| 6,367,012 | B1 * | 4/2002 | Atkinson et al. | 713/176 |
| 2004/0054912 | A1 * | 3/2004 | Adent et al. | 713/181 |
| 2004/0243808 | A1 * | 12/2004 | Ishiguro et al. | 713/176 |
| 2005/0102253 | A1 * | 5/2005 | Wu et al. | 707/1 |
| 2005/0108433 | A1 * | 5/2005 | Wu et al. | 709/246 |

FOREIGN PATENT DOCUMENTS

EP 001396978 A2 * 3/2004

OTHER PUBLICATIONS

Flynn, "Battle for Internet Infrastructure", May 1, 1996, Datamation, V42, #9, via Dialog Text Search, 8 pg.*
Blumenthal et al, "ActiveX Technology, You Can't Go There Today", 1997, InfoWorld, 15 pg.*
"Signing With Microsoft Authenticode Technology", 1996, 16 pg.*

* cited by examiner

*Primary Examiner*—Christopher Revak
(74) *Attorney, Agent, or Firm*—Joan Pennington

(57) ABSTRACT

A method, apparatus and computer program product are provided for protecting ongoing system integrity of a software product using digital signatures. A core product load manifest for protecting ongoing system integrity of a software product having a plurality of pieces includes a manifest header including header attributes of the software product. A list of a plurality of manifest items is stored with the manifest header. Each manifest item identifies a corresponding piece of the software product. Each manifest item includes at least one attribute. A manifest digital signature is stored with the manifest header. The manifest header, the header attributes, each of the plurality of items, and each item attribute are included in the manifest digital signature. A digital signature is computed for each signable piece of the software product and is stored with the piece of the software product. The digital signature of each signed software product piece is excluded from the core product load manifest. An amended manifest is created for identifying added and deleted pieces of the software product and is chained to the core product load manifest. Each signable, added item in the amended manifest has a digital signature that is excluded from the amended manifest.

20 Claims, 9 Drawing Sheets

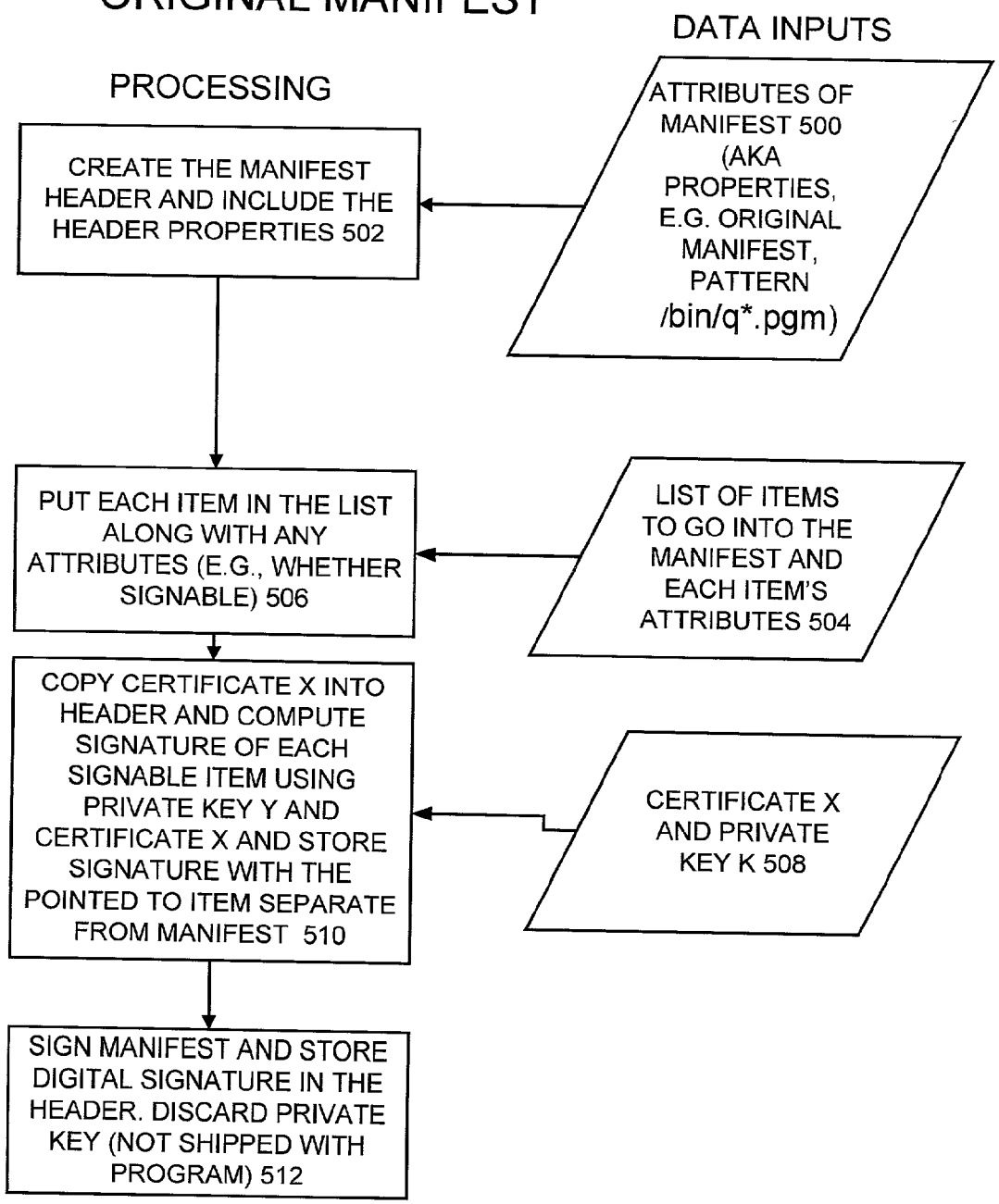

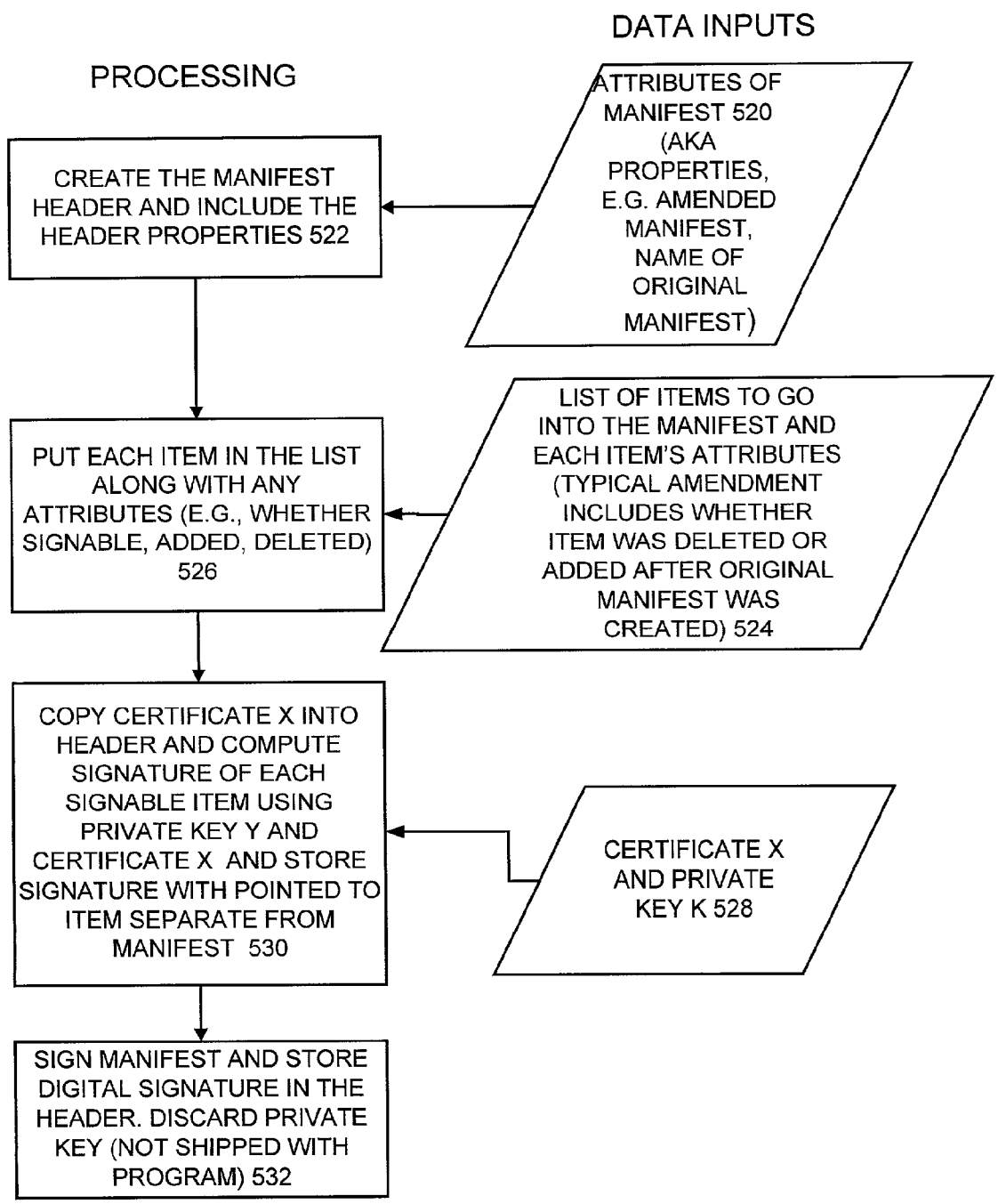

PRODUCT MANIFEST CHAIN 540
USING A SINGLE LINKED LIST

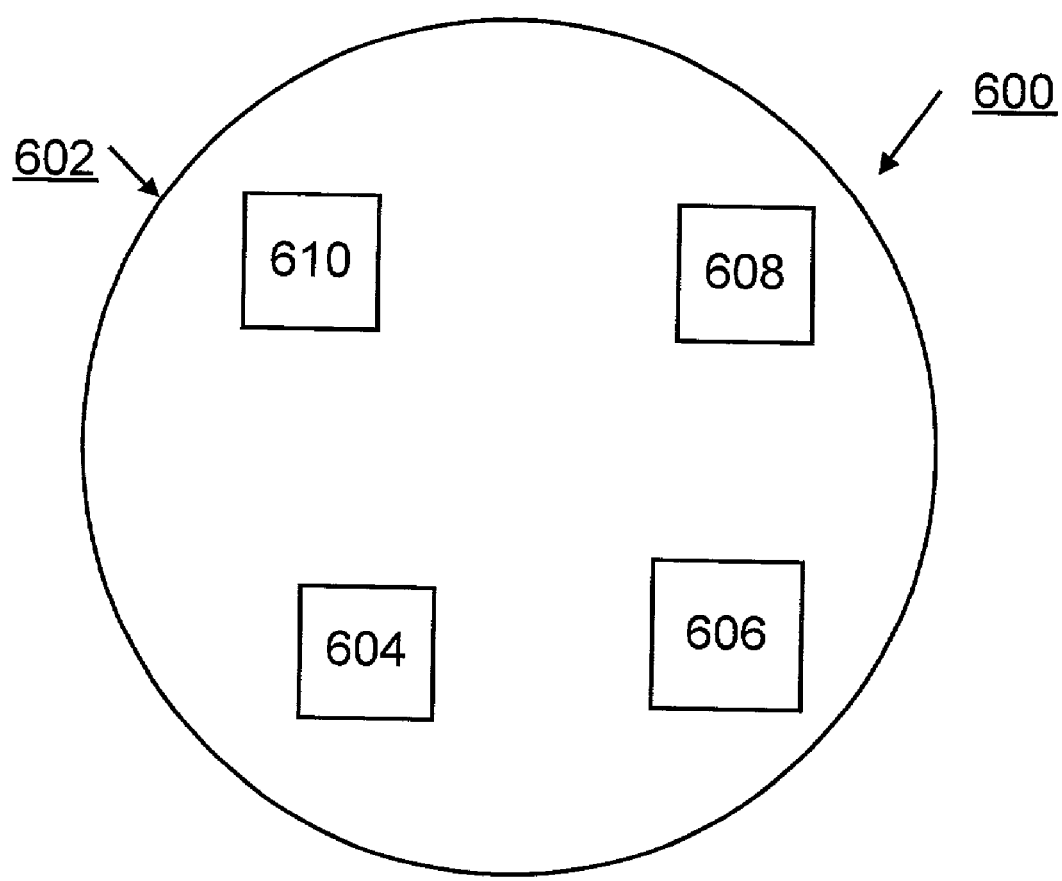

METHOD AND APPARATUS FOR PROTECTING ONGOING SYSTEM INTEGRITY OF A SOFTWARE PRODUCT USING DIGITAL SIGNATURES

FIELD OF THE INVENTION

The present invention relates generally to the data processing field, and more particularly, relates to a method, apparatus and computer program product for protecting ongoing system integrity of a software product using digital signatures.

DESCRIPTION OF THE RELATED ART

Protecting software is becoming an increasing concern for software vendors and users of their software. In the present state of the art, protection typically includes protecting each piece, such as a program, with a digital signature of encrypted hash or checksum that can later be verified. While that can protect the integrity of each piece by detecting tampering of the piece, it may not detect whether a piece of the software product is missing. For this, the art provides for a transport manifest directed to transport integrity of the software product which lists the pieces to be included in the product set; provides for a hash of each piece; and includes an additional digital signature against the transport manifest to ensure manifest integrity.

All the pieces shipped are included in the transport manifest and integrity of the package and its pieces are verifiable at receipt. A transport manifest is invalidated when any piece of the package on the system changes. For example, the transport manifest is invalidated with changes to a data file which keeps customer records as part of running the software product.

Known transport manifests lack provisions for accommodating fixes to a software product or for accommodating ongoing system integrity. If a conventional transport manifest were oriented towards ongoing system integrity it would require that the manifest include only items that should be invariant and preclude items that vary while running the product. The invariant pieces include but are not limited to executables such as programs. Even with such a manifest oriented towards ongoing system integrity, product software updates for ongoing system integrity would not be accommodated. The original manifest is no longer valid for a changed program replacing a program originally in the product. The original manifest is no longer valid after the deleting or adding of a program in the product.

U. S. Pat. No. 5,987,123 discloses a method and apparatus that allows a computer system to trust both program and data files without the intervention of the user and without the possibility of circumventing the model of trust. A file system incorporates two levels of validation for programs and data. A first level of validation specifies sources that the user has decided are trustworthy or untrustworthy. A second level of validation specifies sources that the system itself considers trustworthy or untrustworthy. For data to be acceptable, it must be acceptable to both levels of checking. In addition, both the user and the system can specify multiple acceptable signatures and further allows various ones of the multiple signatures to have different levels of access to the system. The signature data structure stored in memory of a data processing system includes a first entity field storing a name of an entity trusted to perform a file access; a first public key field storing a public key of the first entity; a second entity field storing a name of an entity trusted to perform a file access; and a second public key field storing a public key of the second entity. A file access is performed by a data processing system having memory when an indication is received that an entity desires to perform a file access operation on a file of the data processing system. An affidavit of the file is obtained and the affidavit is checked to be acceptable in accordance with a user signature data structure and a system signature data structure stored in the memory. The file access operation is allowed when the affidavit is acceptable in accordance with both the user signature data structure and the system signature data structure. A secure file is created upon receiving an indication that an entity desires to perform a file access operation on a file of the data processing system by obtaining a private key of the entity; receiving data of the file to be created; determining a checksum of the file; encrypting the checksum using the private key, and creating the file and an associated affidavit that includes the encrypted checksum.

Ongoing system integrity has different requirements than transport integrity does for a software product. Protecting ongoing system integrity of a software product requires that product software updates, a changed program replacing a program originally in the software product, and deleting or adding of a program in the software product be accommodated. A need exists for an effective mechanism and method for protecting ongoing system integrity of a software product.

SUMMARY OF THE INVENTION

A principal object of the present invention is to provide a method, apparatus and computer program product for protecting ongoing system integrity of a software product using digital signatures. Other important objects of the present invention are to provide such a method, apparatus and computer program product for protecting ongoing system integrity of a software product using digital signatures substantially without negative effect and that overcome many of the disadvantages of prior art arrangements.

In brief, a method, apparatus and computer program product are provided for protecting ongoing system integrity of a software product using digital signatures. A core product load manifest for protecting ongoing system integrity of a software product having a plurality of pieces includes a manifest header including header attributes of the software product. A list of a plurality of manifest items is stored with the manifest header. Each manifest item identifies a corresponding piece of the software product. Each manifest item includes at least one attribute. A manifest digital signature is stored with the manifest header. The manifest header, the header attributes, each of the plurality of items, and each item attribute are included in the manifest digital signature.

In accordance with features of the invention, a digital signature is computed for each signable piece of the software product and is stored with or associated with the piece of the software product. The digital signature of each signed software product piece is excluded from the core product load manifest. An amended manifest is created for identifying added and deleted pieces of the software product and is chained to the core product load manifest. Each signable, added item in the amended manifest has a digital signature that is excluded from the amended manifest.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A, 5B, and 5C are flow charts illustrating exemplary steps for implementing ongoing system integrity protection of a software product using digital signatures in accordance with the preferred embodiment;

FIG. 6 is a block diagram illustrating a computer program product in accordance with the preferred embodiment.

DETAILED DESCRIPTION OF THE PREFERRED EMBODIMENTS

Figure 1A:
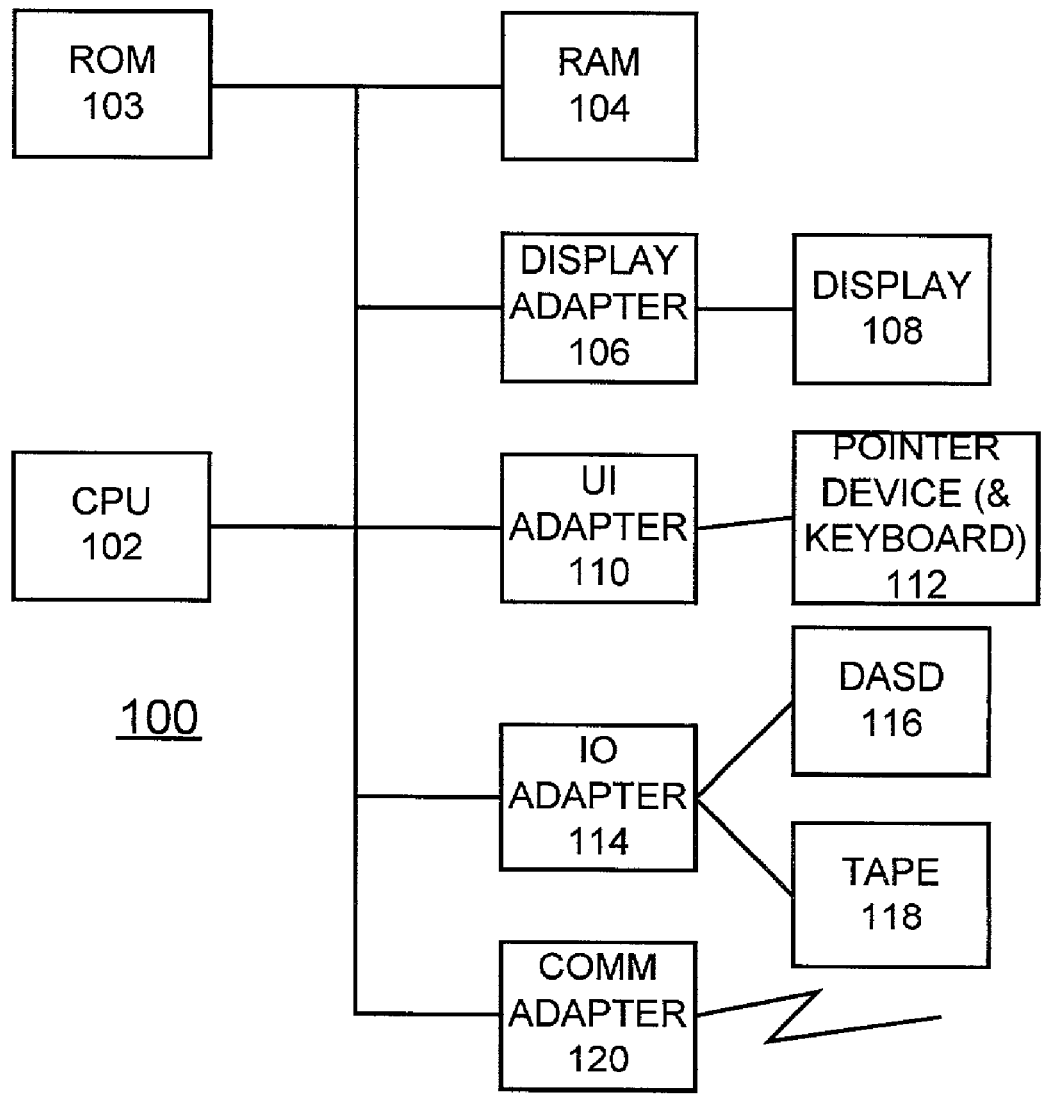
FIGS. 1A and 1B are block diagram representations illustrating a computer system and operating system for implementing ongoing system integrity protection of a software product using digital signatures in accordance with the preferred embodiment.
Figure 1B:
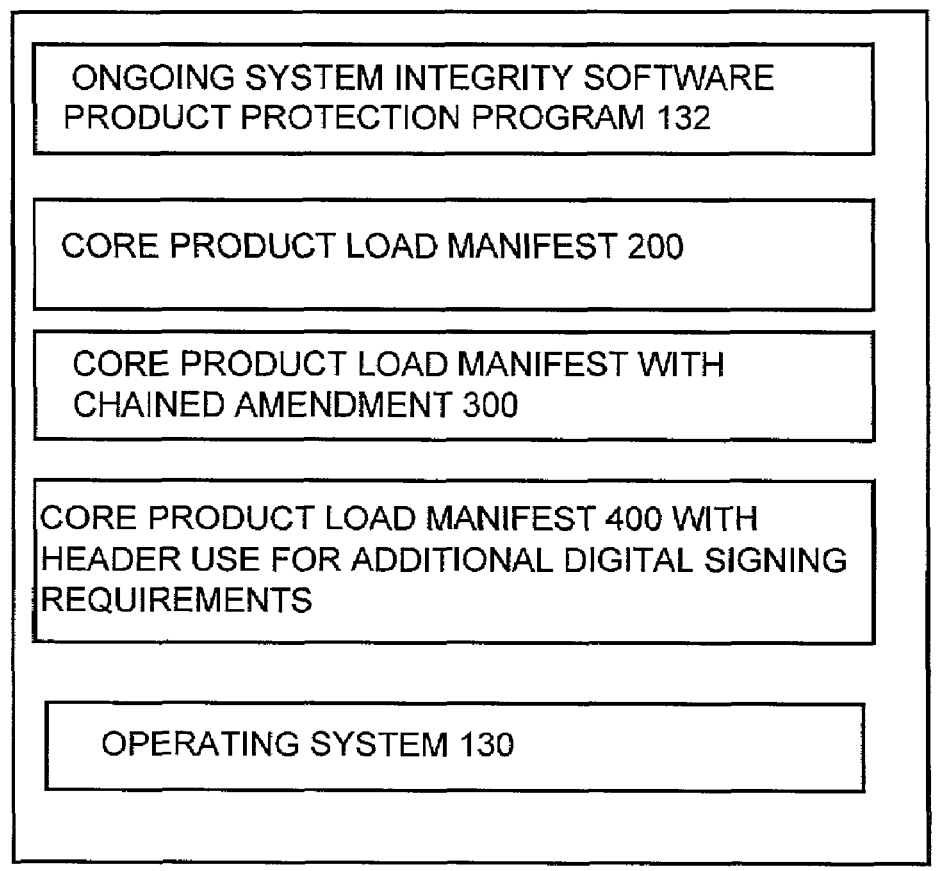

Having reference now to the drawings, in FIGS. 1A and 1B, there is shown a computer or data processing system generally designated by the reference character 100 for carrying out methods for ongoing system integrity protection of a software product using digital signatures of the preferred embodiment. As shown in FIG. 1A, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, and an ongoing system integrity software product protection program 132 of the preferred embodiment. A core product load manifest 200, a core product load manifest with chained amendment 300, and a core product load manifest 400 with header use for additional digital signing requirements are provided with a software product in accordance with the ongoing system integrity software product protection methods of the preferred embodiment. The core product load manifest 200, core product load manifest with chained amendment 300, and core product load manifest 400 with header use for additional digital signing requirements respectively are illustrated and described with respect to FIGS. 2, 3, and 4.

Various commercially available computers can be used for computer system 100; for example, an IBM personal computer. CPU 102 is suitably programmed by the program 132 to execute the flowcharts of FIGS. 5A, 5B and 5C and to implement the core product load manifest 200, the core product load manifest with chained amendment 300, and the core product load manifest 400 with header use for additional digital signing requirements of the preferred embodiment.

In accordance with features of the preferred embodiment, efficient methods are provided for ensuring ongoing system integrity for a software product. Not only is better protection provided for a software product when initially installed on a machine but also better ongoing maintenance is provided of the software product as programs are changed and replaced, added, or deleted within the software product. Also provided is the feature of the core product load manifest 200 to include variant items in the product load manifest which are not digitally signed by flagging such variant items within the product load manifest, and including these flags under the digital signing of the product load manifest. Also provided is the ability to flag certain digital signing requirements on pieces in the core product load manifest 200 through further use of flags within the product load manifest and including these flags under the digital signing of the product load manifest.

Figure 2:
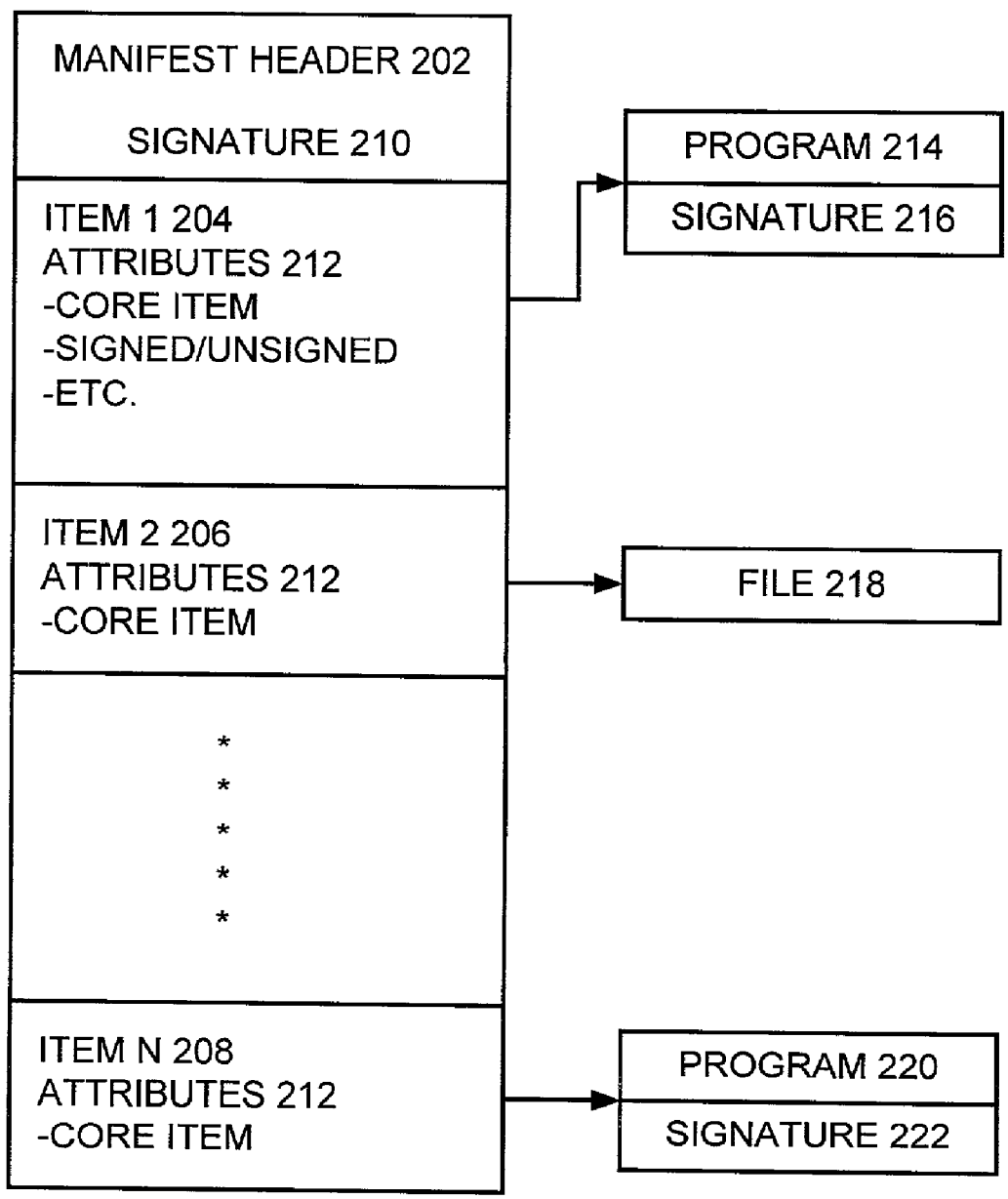
FIG. 2 is a diagram illustrating core product load manifest in accordance with the preferred embodiment.

Referring to FIG. 2, the core product load manifest 200 of the preferred embodiment is illustrated. The core product load manifest 200 of the preferred embodiment is created as illustrated and described with respect to FIG. 5A. The core product load manifest 200 includes a manifest header 202 that contains information regarding the product load and the like; a plurality of items (1–N) 204, 206, 208 that provide names of parts of the product load, and a digital signature 210. Each of the plurality of items (1–N) 204, 206, 208 include attributes 212 that provide additional information about the parts in the core product load. Attributes 212 provide information about the program parts such as core item, signed or unsigned and the like. Items (1–N) 204, 206, 208 in the core product load manifest 200 never carry an added or deleted attribute. As shown in FIG. 2, item 1 points to a program 214 including an associated digital signature 216; item 2 points to a file 218 that does not include a digital signature; and item N points to a program 220 including an associated digital signature 222. In the preferred embodiment, each of the items (1–N) 204, 206, 208 includes a path-qualified name, such as a fully qualified path name or relative path name, or other invariant reference to point to the corresponding part of the product load. Alternatively, another mechanism, such as an addressing pointer could be included in items 1–N to point to the corresponding part of the product load; however, such addressing pointer must be invariant if included in the manifest signature 210. Otherwise, such addressing pointer is excluded from the manifest signature 210 if the addressing pointer is expected to vary.

As shown in FIG. 2, the core product load manifest 200 lists the invariant pieces of the software product that have associated digital signatures, such as item 1, 204 for program 214 having associated digital signature 216 and program 220 having associated digital signature 222, but excludes the digital signatures 216 and 222 from the core product load manifest 200. The core product load manifest 200 may also include objects which significantly vary, such as item 2, 206 for file 218 that has no practical ongoing static associated digital signature. Such items are included in the core product load manifest 200 in order to detect whether such pieces are absent from the product but must be covered by other system security and authority mechanisms. The core product load manifest 200 is signed including the digital signature 210 that covers the manifest header 202 and the plurality of items (1–N) 204, 206, 208 including attributes 212.

If there are no additions or deletions to the software product, the core product load manifest 200 will always have the correct list and the integrity of the product load manifest is verifiable through its digital signature 210. The original product load manifest 200 requires no replacing or amending as long as the list of items in the software product remains the same. On-going system integrity checking is enabled as some product pieces, such as programs are updated through a program fix process utilizing the core product load manifest 200. The original product load manifest 200 does not need to be replaced to ensure the ongoing integrity when one or more software product pieces are replaced since digital signatures of the pieces are excluded from the core product load manifest 200 in accordance with the preferred embodiment.

Figure 3:
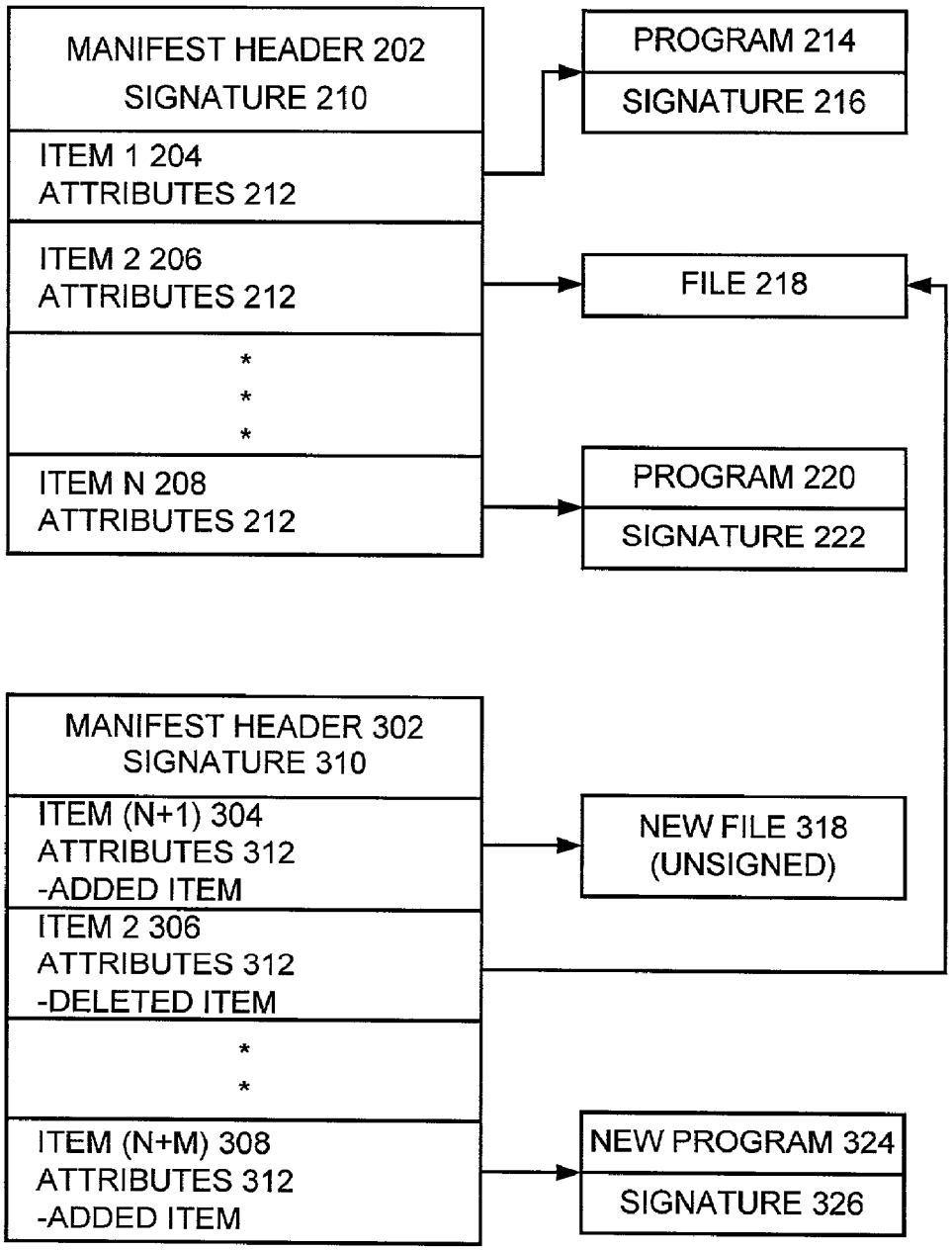
FIG. 3 is a diagram illustrating core product load manifest with a chained amendment in accordance with the preferred embodiment.

In accordance with features of the preferred embodiment, ongoing system integrity checking for a software product is provided that includes the ability to check whether the entire software product is present or missing any pieces. Also provided is the ability to process the product load manifest 200 to check its integrity and to verify pieces that are digitally signed. The addition or deletion of something in the software product is covered with an amended product load manifest 300 as shown in FIG. 3. An additional requirement to use a single certificate for generating the digital signature 210 of the product load manifest 200 and for generating the digital signature 216, 222 for each signed item named in the manifest enhances the security of the methodology of the preferred embodiment.

In accordance with features of the preferred embodiment, a chain of amended product load manifests deals with additions or deletions of pieces of the software product as illustrated by the core product load manifest with chained amendment 300 in FIG. 3 and as illustrated in the flow chart of FIG. 5B.

Referring now to FIG. 3, the core product load manifest with chained amendment 300 of the preferred embodiment is illustrated. The core product load manifest with chained amendment 300 includes the original core product load manifest 200 at the head of the chain. The original core product load manifest 200 remains invariant, while items 1–N, 204, 206, 208 may be variant. If a program is deleted from the product set, a check of the original product load would find it missing but tolerated if listed as deleted in the core product load manifest with chained amendment 300. Moreover, if a program is added, it is included in the core product load manifest with chained amendment 300. As shown in FIG. 3, the core product load manifest with chained amendment 300 includes a manifest header 302, a first item (N+1), 304 for a first added item, such as a new file 318 (unsigned) and an item 2, 306 for a deleted item, such as file 218, an item (N+M) 308 for an added item, such as a new program 324 having an associated signature 326. Similar to the original core product load manifest 200, each amended core product load manifest chain 300 includes an associated digital signature 310. Each item 304, 306, 308 include attributes 312 providing information about the items such as added item, deleted item, core item, signed or unsigned and the like.

In accordance with features of the preferred embodiment, ongoing system integrity checking is enabled through the ability to check whether the entire software product is present or missing any pieces utilizing the core product load manifest with chained amendment 300.

Figure 4:
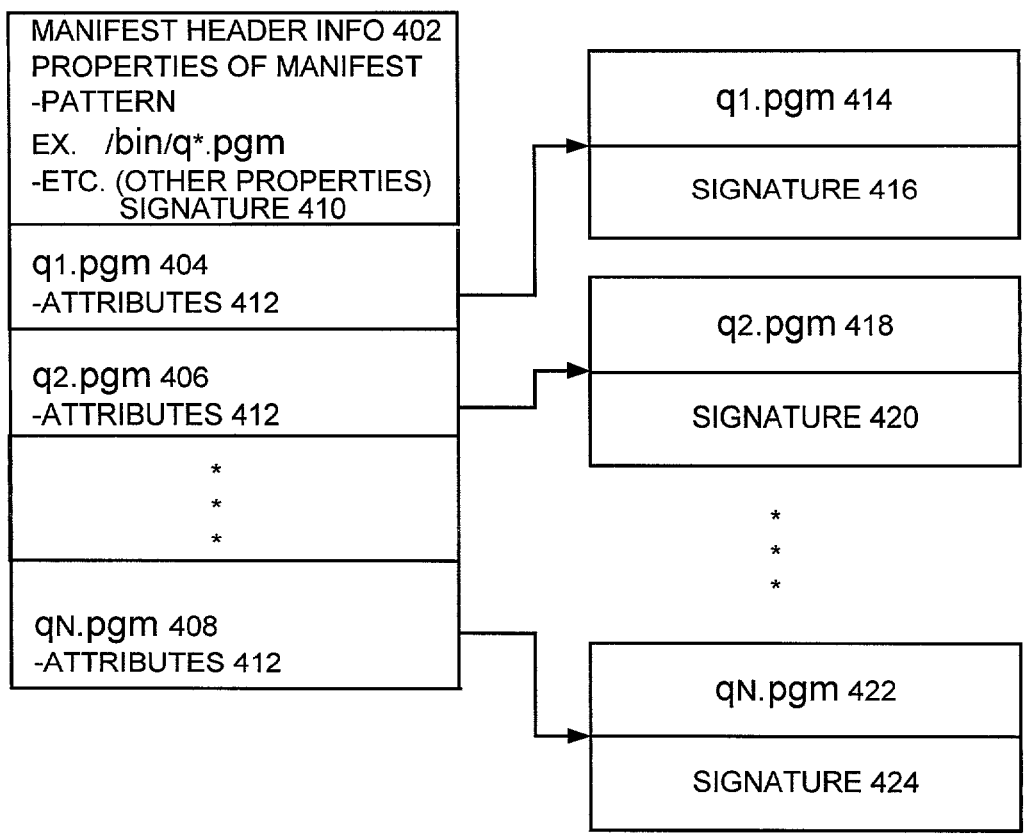
FIG. 4 is a diagram of an exemplary manifest illustrating manifest header use for additional digital signing requirements in accordance with the preferred embodiment.

Referring now to FIG. 4, the core product load manifest 400 is illustrated with header use for additional digital signing requirements of the preferred embodiment. The core product load manifest 400 includes manifest header information 402 including properties of the manifest, such as, pattern, for example, /bin/q*.pgm, and the like. Core product load manifest 400 holds names of items of a given pattern, such as, q1.pgm 404, q2.pgm 406 and qN.pgm 408 and a signature 410. Each of the items, q1.pgm 404, q2.pgm 406 and qN.pgm 408, include attributes 412 and respectively point to a corresponding program q1.pgm 414 having an associated signature 416, q2.pgm 418 having an associated signature 420, and qN.pgm 422 having an associated signature 422. The ability to police a directory, and optionally its subdirectories, or library in entirety or through wild-carding for unwanted additions is provided by including a directive or directives in the product load manifest 200, and the directives are under the product load manifest signature 210. Similarly, directives can be included to permit absence or presence of special files not critical to the product, such as a trace or log file, or if sub-directories should be included, or if relative path names should be allowed.

Referring now to FIG. 5A, there are shown exemplary steps for creating an original core product load manifest 200 for implementing ongoing system integrity protection of a software product using digital signatures in accordance with the preferred embodiment. Data inputs including attributes of the manifest or properties, for example, an original manifest, pattern /bin/q*.pgm, and the like are received as indicated in a block 500. The received data inputs are processed to create the manifest header 202 and include the header properties as indicated in a block 502. Data inputs including a list of items to go into the manifest and each item's attributes are provided as indicated in a block 504. Each item 1–N, 204, 206, 208 in the list along with any attributes 212, such as, whether signable, is put into the core product load manifest 200 as indicated in a block 506. Data inputs including a certificate X and a private key Y are provided as indicated in a block 508. The certificate X is copied into the manifest header 202 and the signature 216, 222 of each of the signable items 1, N, 204, 208 is computed using the private key Y and the certificate X and stored with the program 214 and program 214 separate from the manifest 200 as indicated in a block 510. The core product load manifest 200 is signed and the manifest signature 210 is stored in the manifest header 202, discarding the private key Y that is not shipped with the software product as indicated in a block 512. Manifest header, the header attributes, each of the plurality of items, and each item attribute are included in the manifest signature 210. Any pointers implemented in the header 202 are excluded from the manifest signature 210. The manifest signature 210 stored in the manifest header 202 is not included in the manifest signature 210.

Referring now to FIG. 5B, there are shown exemplary steps for creating the core product load manifest with chained amendment 300 of FIG. 3 for implementing ongoing system integrity protection of a software product using digital signatures in accordance with the preferred embodiment. Data inputs including attributes of the manifest or properties, for example, an amended manifest, and name of the original manifest are received as indicated in a block 520. The received data inputs are processed to create the manifest header 302 and include the header properties as indicated in a block 522. Data inputs including a list of items to go into the amended manifest and each item's attributes are provided as indicated in a block 524. Each item N+1, 2, N+M, 304, 306, 308 in the list along with any attributes 312, such as, whether signable, added item or deleted, is put into the amended manifest 300 as indicated in a block 526. Data inputs including the certificate X and the private key Y are provided as indicated in a block 528. The certificate X is copied into the manifest header 302 and the signature 326 of each of the signable items N+M, 308 is computed using the private key Y and the certificate X and stored with the program 324 separate from the amended manifest 300 as indicated in a block 530. In the preferred embodiment, the same certificate X and private key Y as used for the original core product load manifest 200 is used. It should be understood that a different certificate and/or a different private key can be used for the original core product load manifest 200 and the amended manifest 300. The amended manifest 300 is signed and the manifest signature 310 is stored in the manifest header 302, discarding the private key Y that is not shipped with the software product as indicated in a block 532. Manifest header, the header attributes, each of the plurality of items, and each item attribute are included in the manifest signature 310. Any pointers implemented in the header 302 are excluded from the manifest signature 310. The manifest signature 310 stored in the manifest header 302 is not included in the manifest signature 310.

Figure 5C:
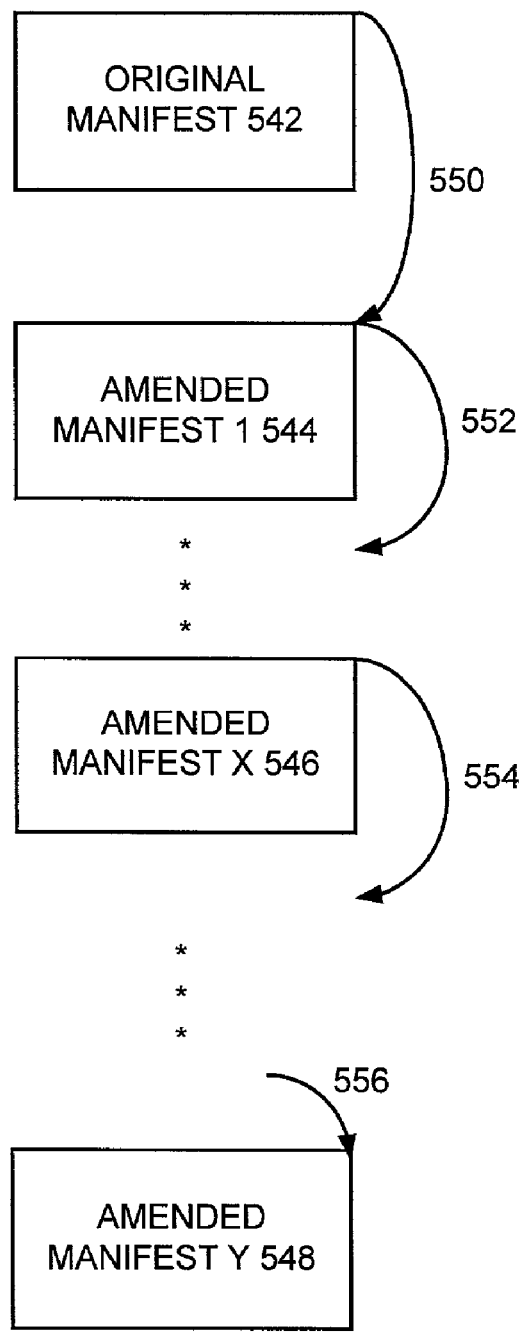

Referring now to FIG. 5C, there are shown an exemplary product manifest chain 540 using a single linked list in accordance with the preferred embodiment. Product manifest chain 540 includes an original manifest 542, an amended manifest 1, 544, an amended manifest X, 546, and an amended manifest Y, 548. A respective pointer 550, 552, 554, 556 is incorporated in the header of each manifest 542, 544, 546 and the pointer is to the next manifest in the product manifest chain 540. Each pointer 550, 552, 554, 556 is excluded from the digital signature of the associated manifest in the preferred embodiment. To append to the product manifest chain 540, a null pointer in the end-of-chain manifest 548 is updated to point to a newly added amended manifest (not shown).

It should be understood that the product manifest chain 540 can be generated by various other techniques. For example, a logical indexing algorithm such as manifest.000 for the original manifest 542, manifest.001 for the amended manifest 1, 544, and manifest.xxx, where xxx represents the numeric digits of successive amended manifests in the product manifest chain 540. The product manifest chain 540 can be a double-linked list and use an additional pointer in the manifest header to point to the previous in-chain manifest. Each pointer is in the double-linked list excluded from the digital signature of the associated manifest in the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for implementing ongoing system integrity protection of a software product of the preferred embodiment in the system 100 of FIG. 1A.

A sequence of program instructions or a logical assembly of one or more interrelated modules defined by the recorded program means 604, 606, 608, 610, direct the computer system 100 for implementing ongoing system integrity protection of a software product of the preferred embodiment.

While the present invention has been described with reference to the details of the embodiments of the invention shown in the drawings, these details are not intended to limit the scope of the invention as claimed in the appended claims.

What is claimed is:

1. A core product load manifest executed by a computer for protecting ongoing system integrity of a software product having a plurality of pieces; said core product load manifest comprising:
   a manifest header including header attributes of the software product;
   a list including a plurality of manifest items stored with said manifest header; each manifest item identifying a corresponding piece of the software product; each manifest item including at least one attribute; and
   a manifest digital signature stored with said manifest header; said manifest header, said header attributes, each of said plurality of items, and each said item attribute included in said manifest digital signature.

2. A core product load manifest executed by a computer for protecting ongoing system integrity of a software product as recited in claim 1 wherein said at least one attribute of each manifest item includes a predefined attribute identifying the corresponding piece of the software product as signed or unsigned.

3. A core product load manifest executed by a computer for protecting ongoing system integrity of a software product as recited in claim 2 wherein a digital signature of said signed corresponding piece of the software product is stored with said signed corresponding piece of the software product and said signature is excluded from said manifest item identifying said signed corresponding piece of the software product.

4. A core product load manifest executed by a computer for protecting ongoing system integrity of a software product as recited in claim 3 wherein said signature of each signed corresponding piece of the software product and said manifest digital signature include a single certificate.

5. A core product load manifest executed by a computer for protecting ongoing system integrity of a software product as recited in claim 1 wherein an amended manifest is generated for identifying added and deleted pieces of the software product.

6. A core product load manifest executed by a computer for protecting ongoing system integrity of a software product as recited in claim 5 wherein said amended manifest is chained to the core product load manifest.

7. A computer executed method for protecting ongoing system integrity of a software product having a plurality of pieces; a computer performing said method comprising the steps of:
   creating a product load manifest for the software product; said product load manifest including a manifest header with header attributes of the software product; a list of a plurality of manifest items; each manifest item identifying a corresponding piece of the software product; each manifest item including at least one attribute identifying the corresponding piece of the software product as signed or unsigned; and a manifest digital signature stored with said manifest header; said manifest header, said header attributes, each of said plurality of items, and each said item attribute included in said manifest digital signature;
   computing a digital signature of each signed piece of the software product; and
   storing each said computed digital signature with the signed piece of the software product and excluding each said computed digital signature from said product load manifest.

8. A computer executed method for protecting ongoing system integrity of a software product as recited in claim 7 wherein the step of creating said product load manifest for the software product includes the step of receiving a certificate and copying said certificate into said manifest header.

9. A computer executed method for protecting ongoing system integrity of a software product as recited in claim 8 wherein the step of computing said digital signature of each signed piece of the software product includes the step of utilizing said certificate and a private key for computing said digital signature of each signed piece of the software product.

10. A computer executed method for protecting ongoing system integrity of a software product as recited in claim 7 further includes the step of creating an amended manifest for identifying added and deleted pieces of the software product.

11. A computer executed method for protecting ongoing system integrity of a software product as recited in claim 10 includes the step of chaining said amended manifest to said product load manifest.

12. A computer executed method for protecting ongoing system integrity of a software product as recited in claim 11 wherein the step of chaining said amended manifest to said product load manifest includes the step of including a pointer in said manifest header of said product load manifest to said amended manifest.

13. A computer executed method for protecting ongoing system integrity of a software product as recited in claim 11 includes the step of creating a next amended manifest for identifying added and deleted pieces of the software product; and generating a single linked list for chaining said next amended manifest and said amended manifest to said product load manifest.

14. A computer executed method for protecting ongoing system integrity of a software product as recited in claim 13 wherein the step of generating said single linked list for chaining said next amended manifest and said amended manifest to said product load manifest includes the step of providing a pointer in said manifest header of said product load manifest to said amended manifest and providing a pointer in a manifest header of said amended manifest to said next amended manifest.

15. A computer executed method for protecting ongoing system integrity of a software product as recited in claim 7 wherein the step of creating said product load manifest for the software product includes the step of including a pattern attribute in said manifest header attributes of the software product.

16. A computer program product for implementing ongoing system integrity protection of a software product having a plurality of pieces; said computer program product including a plurality of computer executable instructions stored on a computer readable medium, wherein said instructions, when executed by a computer, cause the computer to perform the steps of:

creating a product load manifest for the software product; said product load manifest including a manifest header; a list of a plurality of manifest items; each manifest item identifying the corresponding piece of the software product and including at least one attribute identifying the corresponding piece of the software product as signed or unsigned; and a manifest digital signature; said manifest header, each of said plurality of items, and each said item attribute included in said manifest digital signature;

computing a digital signature of each signed piece of the software product; and storing each said computed digital signature with the signed piece of the software product and excluding each said computed digital signature from said product load manifest.

17. A computer program product for implementing ongoing system integrity protection of a software product as recited in claim 16 wherein said instructions, when executed by a computer, further cause the computer to perform the steps of creating an amended manifest for identifying added and deleted pieces of the software product.

18. A computer program product for implementing ongoing system integrity protection of a software product as recited in claim 16 wherein said instructions, when executed by a computer, further cause the computer to perform the steps of generating a single linked list for chaining said amended manifest to said product load manifest.

19. A computer program product for implementing ongoing system integrity protection of a software product as recited in claim 16 wherein the step of creating said product load manifest for the software product includes the step of receiving a certificate and copying said certificate into said manifest header.

20. A computer program product for implementing ongoing system integrity protection of a software product as recited in claim 19 wherein the step of computing said digital signature of each signed piece of the software product includes the step of utilizing said certificate and a private key for computing said digital signature of each signed piece of the software product.

* * * * *